Oct. 31, 1950     F. S. ELSAESSER     2,528,125
HAMBURG STEAK PATTY FORMING MACHINE
Filed March 12, 1945     3 Sheets-Sheet 1
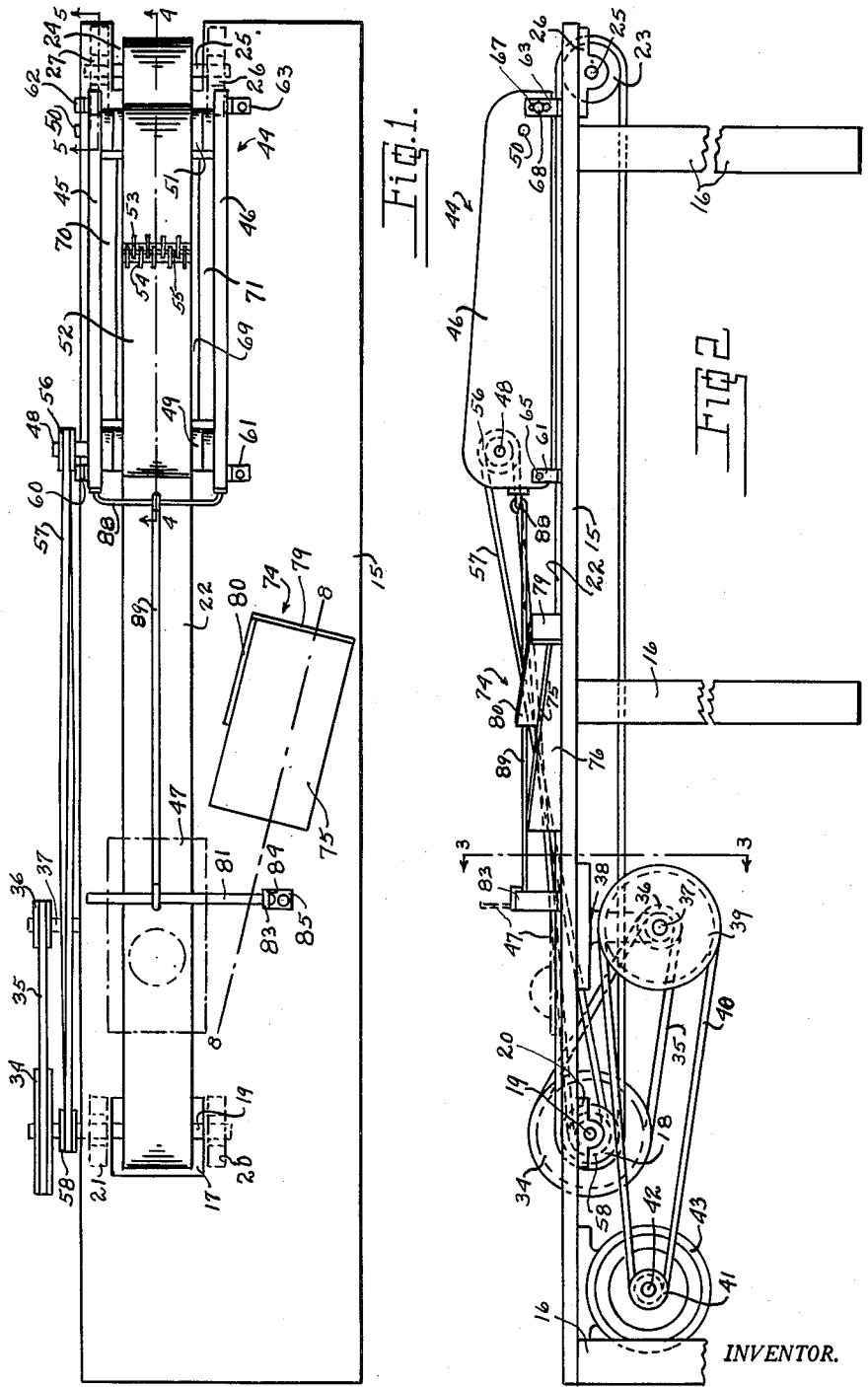
INVENTOR.
FRANK S. ELSAESSER
BY
Joseph A. Rave
Attorney Oct. 31, 1950 F. S. ELSAESSER 2,528,125
HAMBURG STEAK PATTY FORMING MACHINE
Filed March 12, 1945 3 Sheets-Sheet 2

INVENTOR.
FRANK S. ELSAESSER
BY
Joseph A. Rave
Attorney

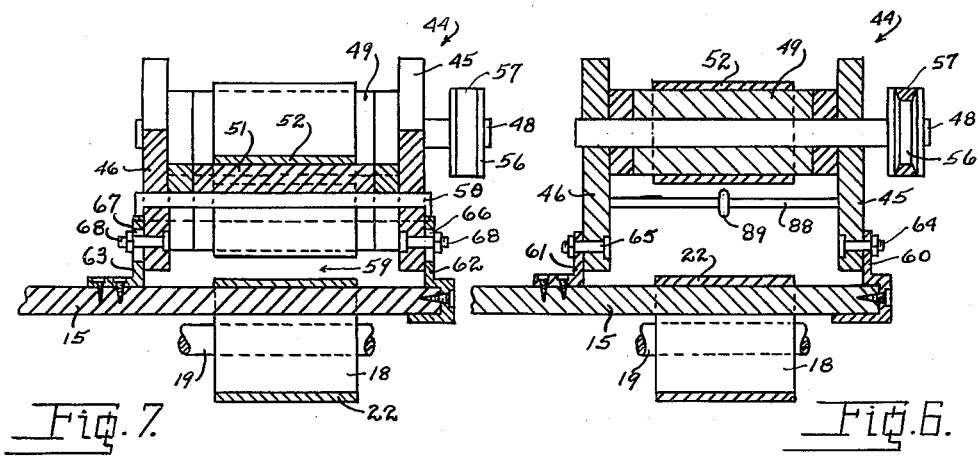
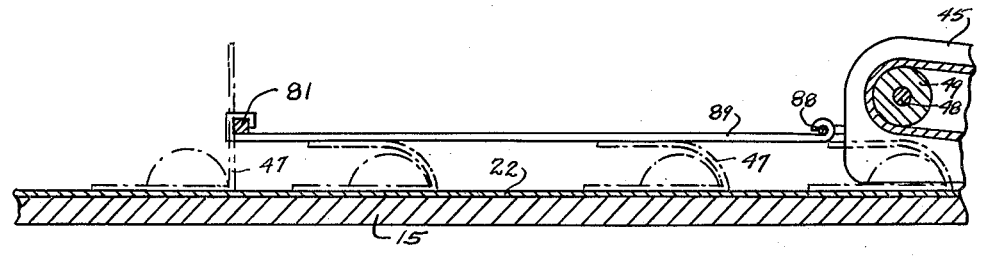
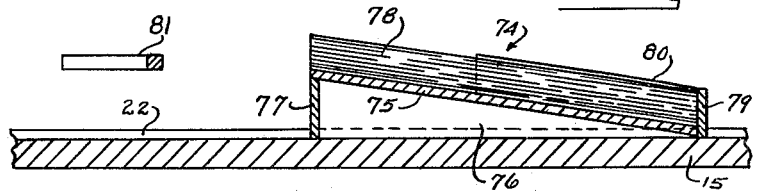
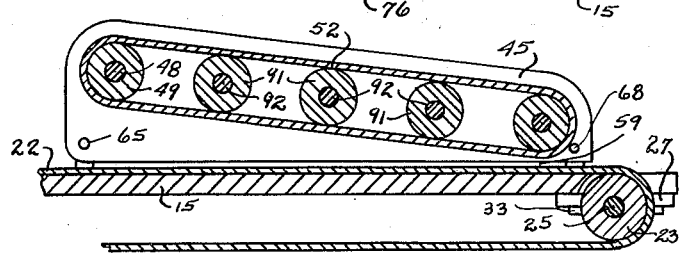
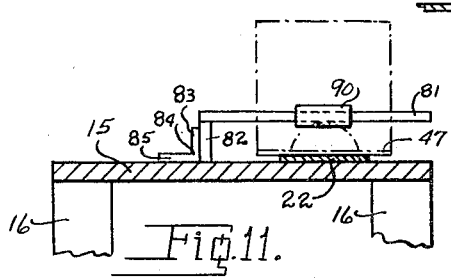

Patented Oct. 31, 1950

2,528,125

UNITED STATES PATENT OFFICE 2,528,125

HAMBURG STEAK PATTY FORMING MACHINE

Frank S. Elsaesser, Cincinnati, Ohio

Application March 12, 1945, Serial No. 582,331

12 Claims. (Cl. 17—32)

This invention relates to improvements in Hamburg steak forming machines and particularly to a machine for forming the patty, as used in cooking or frying the same.

Machines for this purpose have been made in the past but were in the main impractical since no adequate means were provided to prevent the meat from adhering to the forming parts of the machine, or the process was so slow in operation as to be uneconomical to use. Other machines required the handling of heavy parts such as a feed cylinder from which the so-called, ground meat was fed to the patty forming parts.

The machine of this invention obviates all of these difficulties resulting in a machine that rapidly produces Hamburg steak patties as well as other meat patties such as "country style" pork sausage, and the like.

It is therefore the main object of this invention to provide a machine to produce meat patties such as are used in Hamburg steak.

Another object of this invention is the provision of a machine that will accomplish the above object and which is of simple construction and can be operated by inexperienced operators.

Another object of this invention is the provision of a meat patty forming machine in which the patties are expeditiously produced and in which sanitation is attained in an economical manner.

Other objects and advantages of the present invention should be readily apparent by reference to the following specification considered in conjunction with the accompanying drawings forming part thereof and it is to be understood that any modifications may be made in the exact structural details there shown and described, within the scope of the appended claims, without departing from or exceeding the spirit of the invention.

In the drawings:

Fig. 1 is a top plan view of a machine embodying the principles of this invention.

Fig. 2 is a front elevational view of the machine illustrated in Fig. 1.

Fig. 6 is a fragmentary sectional view taken on line 6—6 of Fig. 4.

Fig. 7 is a fragmentary sectional view taken on line 7—7 of Fig. 4.

Fig. 8 is an enlarged sectional view taken through a portion of the machine on line 8—8 of Fig. 1.

Fig. 9 is a semi-diagrammatic view illustrating the action of the machine.

Fig. 10 is a view similar to Fig. 4 showing a modification in the structure thereof.

Fig. 11 is a view similar to Fig. 3 showing a modification in the structure thereof.

Throughout the several views of the drawings, similar reference characters are employed to denote the same or similar parts.

Figure 3:
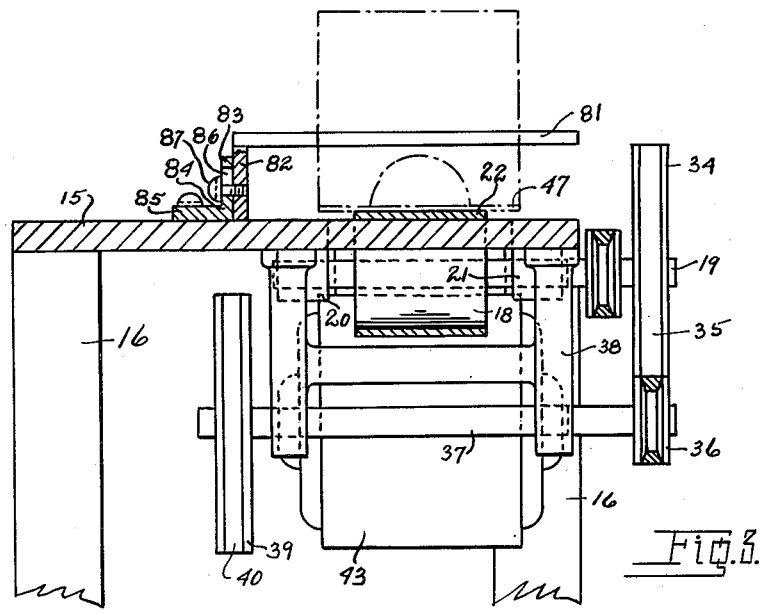
Fig. 3 is an enlarged transverse sectional view taken on line 3—3 of Fig. 2.

The machine of this invention will find its principal use in restaurants, dining rooms and the like establishments which feature or serve Hamburg steak or "Hamburgers" as they are popularly called. It has been found that Hamburg steak patties can be formed on this machine at a rate requiring but a single attendant that formerly needed three and four persons and that the patties are of uniform physical properties, that is, of the same area, thickness and density whereas formerly each maker developed his own technique which resulted in variations of these properties wherefore the resulting cooked Hamburg steaks were of different degrees of being done.

The machine comprises a table member 15 supported in any suitable or desirable manner as by legs 16. Intermediate its ends the table 15 is provided with an opening 17 of a size to receive a drum or pulley 18. The pulley 18 is secured to a shaft 19 rotatably mounted in bearings 20 and 21, respectively, located one on each side of the opening 17. Partially encircling the pulley 18 is a belt 22 made of flexible material and adapted to be washed or otherwise cleaned from time to time. The belt 22 is a conveyor belt for conveying the meat to and through a mashing unit or patty former.

The conveyor belt 22 partially encircles a second drum or pulley 23, located some distance from the pulley 18, for example as shown in the drawings, at one end of the table 15 in a recess 24 provided in said table therefor. It should be understood that instead of the recess 24 at the end of the table, an opening similar to opening 17, could be provided in the table for the said pulley 23. This pulley 23 is secured to a shaft 25 rotatably mounted in bearings 26 and 27 secured to the table, respectively, one on each side of the recess 24. The ends of the belt 22 are joined to one another to make it an endless conveyor and this joining may be accomplished in any suitable or desirable manner. As illustrated in the drawings the joining is effected by providing each end of the belt with projecting metal loops 28 and 29, which interleaf to form a passageway through which a pin 30 passes. By this construction, the ends of the belt may be readily separated and the belt removed from the machine for washing or otherwise cleaning.

The bearings 26 and 27 are utilized to supply the belt 22 with the necessary tension and to take up any slack that may develop therein. To accomplish this the bearing brackets 26 and 27 are each provided with elongated apertures 31 and 32 through which the mounting bolts 33 pass and whereby the brackets with their shaft 25 may be adjusted toward and from the shaft 19.

The drum or pulley 18 is the driving pulley for the conveyor belt 22 and has its shaft 19 projecting beyond one side of the table 15 to have secured thereto a pulley 34 about which passes transmission belt 35. The transmission belt 35 also passes around pulley 36 secured to one end of intermediate shaft 37. The intermediate shaft 37 is rotatably mounted in bracket 38 shown as secured to the underside of the table 15 and depending therefrom. Secured to the other end of the intermediate shaft 37 is a pulley 39 having extending therearound a transmission belt 40. This transmission belt 40 also extends around the driving pulley 41 on the shaft 42 of electric motor 43. It will be noted that the pulleys are of different diameters which is for the purpose of reducing the speed of drum or pulley 18 from that of motor 43 and it should be noted that any other speed reducing transmission device may be arranged between the driving motor and said conveyor belt driving pulley or drum.

It will be noted that the conveyor belt driving pulley 18 and the driven pulley 23 are mounted to be tangent to the table top wherefore the upper layer of the conveyor belt moves along the said table top. Near the driven drum or pulley 23 the conveyor belt 22 passes beneath the mashing or flattening mechanism indicated in general by the reference numeral 44. This mashing or flattening mechanism gives the final shape or form to the Hamburg steak patty.

Figure 4:
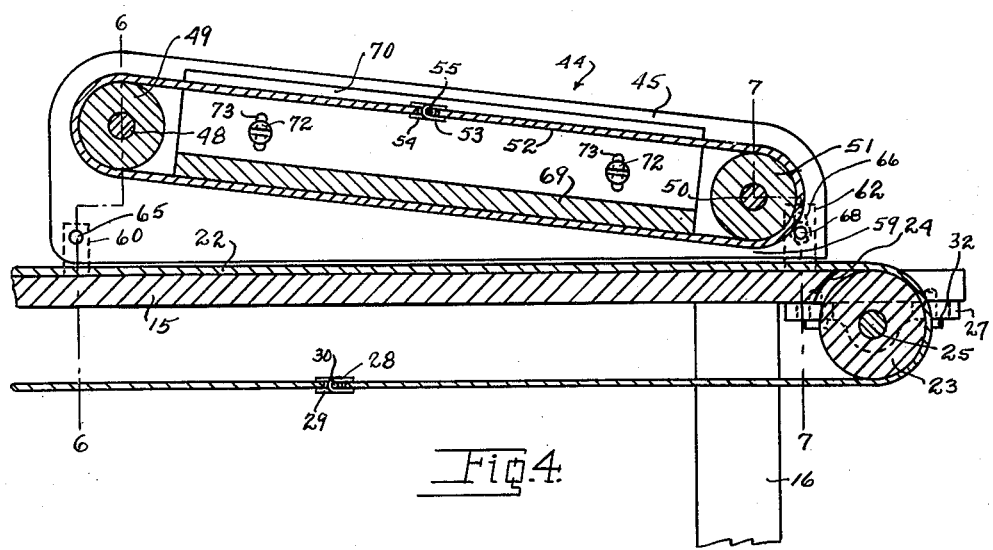
Fig. 4 is an enlarged longitudinal sectional view of a portion of the machine taken on line 4—4 of Fig. 1.
Figure 5:
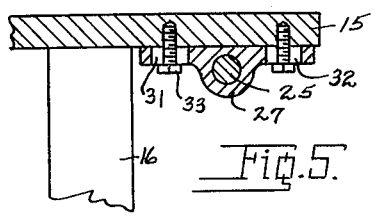
Fig. 5 is an enlarged fragmentary sectional view taken on line 5—5 of Fig. 1.

The mashing or flattening mechanism 44 comprises side members 45 and 46 spaced from one another a distance to permit a paper sheet 47 to pass between them. Rotatably mounted in the side members 45 and 46 near their front ends and some distance above the conveyor belt 22, is a shaft 48 having secured to it a drum or pulley 49. The masher side members 45 and 46 near their rear ends also have rotatably mounted therein a shaft 50, which has secured to it a drum or pulley 51. It will be noted, particularly from Fig. 4, that the shaft 50 is located much nearer the conveyor belt than shaft 48. Extending around the drums or pulleys 49 and 51 is a belt 52, made endless by joining the ends thereof to one another through the usual belt lacing comprising metal loops 53 and 54 extending respectively from each end of the belt 52 toward the other and interleaved to form a passageway through which a connecting pin 55 passes. By this construction the said belt 52 may be removed from the masher mechanism for cleaning and or replacement purposes as may the conveyor belt 22.

The drum or pulley 49 is the driving pulley while the drum or pulley 51 is the driven or idler pulley for which reason the shaft of pulley 49 extends beyond the masher side and has secured to it a pulley 56 partially encircled by a transmission belt 57. The transmission belt 57 also partially encircles a second pulley 58 on the shaft 19 of the conveyor belt driving pulley 18. The transmission belt pulleys 56 and 58 are of equal diameter so that the belts 22 and 52 have the same rate of travel. As will be seen in Fig. 4, the upper layer of conveyor belt 22 is directly below and opposed to the bottom layer of masher belt 52. These belt layers are to travel in the same direction, that is, from left to right, as seen in the drawings wherefore, the transmission belt 57 is twisted, as seen in Figs. 1 and 2, causing the shaft 19 to rotate clockwise and the shaft 49 to rotate counterclockwise.

As noted above, and can be seen from Fig. 4, the shaft 48 is a greater distance from belt 22 than the shaft 50 thereby providing a contracting throat which constitutes the masher or flattening chamber with the final thickness or thinness of the Hamburg steak determined by the space between belts 22 and 52 at the point where the belt 52 passes around the lowest point of the drum or pulley 51 and this point is indicated in the drawings by the reference character 59.

The operation of the masher 44 is as follows.

The conveyor belt 22 carries a quantity of ground meat into the large end of the mashing or flattening chamber and the ground meat is engaged on its upper side by the belt 52, which being driven, assists in moving the said meat through the chamber. Since the said belts 22 and 52 gradually converge toward one another, the meat is likewise reduced in thickness until the narrowest point 59 of the chamber is reached whereupon the driven or idler drum 51 completes the flattening of the ground meat into a patty ready for cooking. The original quantity of ground meat that entered the flattening chamber was the right amount to produce the desired Hamburg steak.

The masher mechanism 44 is secured in place by a pair of brackets 60 and 61 respectively, connecting the front ends of side members 45 and 46 to the table top 15 and by brackets 62 and 63 which respectively secure the rear ends of said side members to the table top. The front brackets are permanently secured to the table and have a pivotal connection at 64 and 65 with their respective side members, while the brackets 62 and 63 are likewise permanently secured to the table and they have an adjustable connection at 66 and 67 with their side members. This adjustable connection consisting of a slot in each bracket 62 and 63 through each of which passes a clamp bolt 68. From this it will be seen that the exit throat 59 of the masher chamber may be varied in thickness by adjusting the masher mechanism about the pivots 64 and 65 to raise or lower the drum or pulley 51 relative to the conveyor belt 22.

In order to effect the mashing or flattening of the meat as it passes through the masher chamber, the lower portion of the belt 52 is backed up by a pressure board or buckboard 69. The pressure board 69 may be mounted in position through wings 70 and 71 respectively, projecting from the sides thereof and having passing therethrough, into the masher side members 45 and 46, bolts 72. By providing the pressure board wings 70 and 71, with elongated apertures 73 for the bolts 72 the pressure board 69 may be adjusted toward and from the conveyor belt 23.

The quantity of ground meat used to make a Hamburg steak is usually measured out by a scoop similar to the well known "ice cream scoop" and is placed on a piece of prepared paper, that is, paper generally rendered moisture proof and is then covered with a second piece of similar paper. The size of the paper used was such that it completely covers the flattened or mashed Hamburg steak patty and it is between these layers of the paper that the meat extends while passing between the belts 22 and 52. It was found that this method was cumbersome and somewhat laborious and the following method and apparatus devised.

The paper 47, shown in dot and dash lines in Fig. 1, is of an area such that it will cover both the bottom and top of the flattened Hamburg steak patty and is therefore folded over the ground meat before it is flattened. In order to expeditiously accomplish this a paper receptacle, indicated in general by the reference character 74, is provided on the table 15 adjacent the conveyor belt 22. This receptacle may be secured to the table or merely placed thereon and comprises, as seen in Fig. 8, an upwardly inclined platform 75 having side supports 76 and a front support 77. Disposed on the platform is a stack 78 of papers 47 held from sliding from the platform by guard rails 79 and 80.

Forwardly of the paper receptacle 74 there is provided a bar 81 which is disposed transversely of the conveyor belt 22 upwardly thereof a distance to permit the ground meat to pass thereunder. Hamburg steaks are made to different sizes requiring different quantities of meat wherefore the bar 81 may be required to be raised or lowered and accordingly the bar 81 is provided with a depending leg 82 having face sliding contact with the vertical arm 83 of an angle bracket 84 secured to the table 15 through its horizontal arm 85. The vertical arm 83 is provided with an elongated aperture 86 through which a threaded bolt 87 passes into a tapped aperture in the bar leg 82 and whereby the bar 81 may be vertically adjusted within the limits of the elongated aperture 86.

As is well known, ground meat, due to its inherent moisture content is slightly sticky and this characteristic is taken advantage of in utilizing the machine of this invention. The operator will fill his scoop with ground meat and place the open end thereof, that is the meat at this open end of the scoop, on the topmost paper of the stack 78 about centrally of the half thereof adjacent to the bar 81 and then shift the scoop toward the conveyor belt 22. Due to the stickiness of the ground meat the uppermost paper 47 of the stack 78 will be carried with the scoop. With the paper receptacle in the position shown in Fig. 1 in relation to the bar 81, the shifting of the scoop carries the paper over the bar 81 so that the ground meat and paper are deposited on the conveyor belt in about the position illustrated in phantom lines in Fig. 1. The half of the paper ahead of the ground meat is however, not lying flat on the conveyor belt 22, but is normal thereto as illustrated clearly in Figs. 2 and 9, in phantom lines, with the ground meat and first half of the paper 47 on said conveyor belt. The conveyor belt 22 being constantly driven immediately carries the ground meat and paper toward the flattening or mashing unit beneath the bar 81 thereby causing said bar to fold over the second half of the paper 47. If the masher or flattening mechanism were located adjacent to the bar 81, the ground meat with its paper in covering position would immediately be pressed into engagement but to permit an inspection and observation of the movement of these parts, the mechanism 44 is somewhat removed from the bar 81 and means are provided to insure the covering portion of the paper remaining in position and preventing this portion of the paper from assuming its natural flat portion.

Accordingly, the mashing or flattening unit 44 has secured to the forward ends of its side members and extending transversely of the belt 22, a rod 88 to which one end of a guide or paper hold down member 89 is attached. The other end of the guide 89 is attached to the bar 81 and the guide extends longitudinally of the conveyor belt 22 substantially down its longitudinal center as illustrated most clearly in Fig. 1. The action or operation of the guide 89 is clearly illustrated in Fig. 9, the guide holds the covering half of the paper of successive ground meat and paper units in position until they enter the masher and flattening unit throat.

In Fig. 11 is shown a modification whereby the covering portion of the paper 47 is held to the meat by taking advantage of the sticky quality of the meat. This is accomplished by providing the bar 81 with a loose roller 90 and adjusting the bar 81 to such a position that the ground meat with its cover paper thereabove is engaged by the roller 90 instead of passing freely thereunder as above described. The guide or paper hold down member 89 may be retained as a safeguard against the covering paper becoming loosened from the ground meat and tending to flatten out.

In Fig. 10 is shown a modification wherein the pressure board or buckboard 69 may be dispensed with and in its place are provided a plurality of drums or rollers 91 each mounted on a shaft 92 carried by the masher side members 45 and 46. The drums or rollers 91 are mounted in such positions that their peripheries engage and back up the lower reach of the belt 52. By this construction the quantity of meat is reduced in thickness in stages as it passes beneath successive drums or rollers instead of being continuously flattened by the action of the pressure board and table top, but the final Hamburg steak patty is the same in each instance since the height of the outlet 59 of the masher throat determines the final size of the patty.

From the foregoing it will now be appreciated there has been provided a machine for producing Hamburg steak patties that meets the objects initially set forth.

What is claimed is:

1. In a device of the class described the combination of a pair of driven belts in superposed converging relation forming between them a contracting throat to reduce a quantity of ground meat to a Hamburg steak patty, means for introducing the ground meat to the larger end of the contracting throat, said ground meat having beneath it paper, and means for folding the paper on to the ground meat before its introduction into the contracting throat.

2. In a device of the class described the combination of a supporting table, a conveyor belt on said table for transporting a quantity of ground meat, a flattening mechanism including a second belt above the conveyor belt converging toward said conveyor belt for flattening the ground meat, said ground meat having paper between it and the conveyor belt and said paper being adapted to be folded to be above the upper surface of the ground meat, and means for effecting said folding of the paper above the meat before being subjected to the action of the flattening belt.

3. In a device of the class described the combination of a supporting table, a conveyor belt on said table for transporting a quantity of ground meat, a flattening mechanism including a second belt above the conveyor belt converging toward said conveyor belt for flattening the ground meat, said ground meat having paper between it and the conveyor belt and said paper being adapted to be folded to be above the upper surface of the ground meat, said paper and meat being adapted to be placed on the conveyor belt simultaneously, and a bar extending transversely of the belt adjacent which the ground meat and paper are placed on the conveyor belt with said bar disposed above the conveyor belt and holding the foldable portion of the paper from the conveyor belt and folding same onto the ground meat as it passes thereunder.

4. In a device of the class described the combination of a supporting table, a conveyor belt on said table for transporting a quantity of ground meat, a flattening mechanism including a second belt above the conveyor belt converging toward said conveyor belt for flattening the ground meat, said ground meat having paper between it and the conveyor belt and said paper being adapted to be folded to be above the upper surface of the ground meat, said paper and meat being adapted to be placed on the conveyor belt simultaneously, and a bar extending transversely of the belt adjacent which the ground meat and paper are placed on the conveyor belt with said bar disposed above the conveyor belt and holding the foldable portion of the paper from the conveyor belt and folding same onto the ground meat as it passes thereunder, and means on said bar pressing the covering portion of the paper into sticking engagement with the ground meat.

5. In a device of the class described the combination of a supporting table, a conveyor belt on said table for transporting a quantity of ground meat, a flattening mechanism including a second belt above the conveyor belt converging toward said conveyor belt for flattening the ground meat, said ground meat having paper between it and the conveyor belt and said paper being adapted to be folded to be above the upper surface of the ground meat, said paper and meat being adapted to be placed on the conveyor belt simultaneously, and a bar extending transversely of the belt adjacent which the ground meat and paper are placed on the conveyor belt with said bar disposed above the conveyor belt and holding the foldable portion of the paper from the conveyor belt and folding same onto the ground meat as it passes thereunder, and a paper receptacle on the supporting table adjacent the bar and conveyor belt from which the paper sheet is extracted prior to placing it and the ground meat on the conveyor belt.

6. In a device of the class described the combination of a supporting table, a conveyor belt on said table for transporting a quantity of ground meat, a flattening mechanism including a second belt above the conveyor belt converging toward said conveyor belt for flattening the ground meat, said ground meat having paper between it and the conveyor belt and said paper being adapted to be folded to be above the upper surface of the ground meat, said paper and meat being adapted to be placed on the conveyor belt simultaneously, and a bar extending transversely of the belt adjacent which the ground meat and paper are placed on the conveyor belt with said bar disposed above the conveyor belt and holding the foldable portion of the paper from the conveyor belt and folding same onto the ground meat as it passes thereunder, and a paper receptacle on the supporting table adjacent the bar and conveyor belt, said receptacle including an inclined supporting platform for a stack of individual papers with the high end of platform adjacent the bar and of a height substantially equal to the height the bar is above the conveyor belt whereby the top paper sheet may be extracted across the bar onto the conveyor belt at the time the ground meat is placed thereon.

7. In a device of the class described the combination of a supporting table, a conveyor belt on said table for transporting a quantity of ground meat, a flattening mechanism including a second belt above the conveyor belt converging toward said conveyor belt for flattening the ground meat, said ground meat having paper between it and the conveyor belt and said paper being adapted to be folded to be above the upper surface of the ground meat, said paper and meat being adapted to be placed on the conveyor belt simultaneously, and a bar extending transversely of the belt adjacent which the ground meat and paper are placed on the conveyor belt with said bar disposed above the conveyor belt and holding the foldable portion of the paper from the conveyor belt and folding same onto the ground meat as it passes thereunder, and means between the bar and flattening mechanism for holding the portion of the paper above the ground meat until the flattening mechanism is reached.

8. In a device of the class described the combination of a supporting table, a conveyor belt on said table for transporting a quantity of ground meat to a flattening mechanism for flattening said ground meat into a patty, and a flattening mechanism on said table including a pair of side members located one on each side of the conveyor belt and upstanding from said table, rollers between said side members near the ends thereof with one of said rollers located nearer the conveyor belt than the other, said nearer roller determining and effecting the final thickness of the meat patty, and a flattening belt extending between said rollers and due to the relative positions of the rollers above the conveyor belt forming thereby a contracting throat.

9. In a device of the class described the combination of a supporting table, a conveyor belt on said table for transporting a quantity of ground meat to a flattening mechanism for flattening said ground meat into a patty, and a flattening mechanism on said table including a pair of side members located one on each side of the conveyor belt and upstanding from said table, rollers between said side members near the ends thereof with one of said rollers located nearer the conveyor belt than the other, said nearer roller determining and effecting the final thickness of the meat patty, a flattening belt extending between said rollers and due to the relative positions of the rollers above the conveyor belt forming thereby a contracting throat, means for pivotly connecting with the table the ends of the flattening mechanism side members at the remote flattening belt roller, and means for adjustably securing with the table the ends of the flattening mechanism side members at the nearer roller for adjusting the said side members about the pivotal mounting of the other end whereby the said nearer roller may be adjusted toward and from the conveyor belt to vary the ground meat patty thickness and vary the angle of convergence of the flattening belt.

10. In a device of the class described the combination of a supporting table, a conveyor belt on said table for transporting a quantity of ground meat to a flattening mechanism for flattening said ground meat into a patty, and a flattening mechanism on said table including a pair of side members located one on each side of the conveyor belt and upstanding from said table, rollers between said side members near the ends thereof with one of said rollers located nearer the conveyor belt than the other, said nearer roller determining and effecting the final thickness of the meat patty, a flattening belt extending between said rollers and due to the relative positions of the rollers above the conveyor belt forming thereby a contracting throat, means for pivotly connecting with the table the ends of the flattening mechanism side members at the remote flattening belt roller, means for adjustably securing with the table the ends of the flattening mechanism side members at the nearer roller for adjusting the said side members about the pivotal mounting of the other end whereby the said nearer roller may be adjusted toward and from the conveyor belt to vary the ground meat patty thickness and vary the angle of convergence of the flattening belt, and non-yielding backing up means for the flattening belt carried by the flattening mechanism side members.

11. In a device of the class described the combination of a supporting table, a conveyor belt on said table for transporting a quantity of ground meat to a flattening mechanism for flattening said ground meat into a patty, and a flattening mechanism on said table including a pair of side members located one on each side of the conveyor belt and upstanding from said table, rollers between said side members near the ends thereof with one of said rollers located nearer the conveyor belt than the other, said nearer roller determining and effecting the final thickness of the meat patty, a flattening belt extending between said rollers and due to the relative positions of the rollers above the conveyor belt forming thereby a contracting throat, means for pivotly connecting with the table the ends of the flattening mechanism side members at the remote flattening belt roller, and means for adjustably securing with the table the ends of the flattening mechanism side members at the nearer roller for adjusting the said side members about the pivotal mounting of the other end whereby the said nearer roller may be adjusted toward and from the conveyor belt to vary the ground meat patty thickness and vary the angle of convergence of the flattening belt, and non-yielding backing up means for the flattening belt carried by the flattening mechanism side members, comprising a flat surface against which the said flattening belt rides.

12. In a device of the class described the combination of a supporting table, a conveyor belt on said table for transporting a quantity of ground meat to a flattening mechanism for flattening said ground meat into a patty, and a flattening mechanism on said table including a pair of side members located one on each side of the conveyor belt and upstanding from said table, rollers between said side members near the ends thereof with one of said rollers located nearer the conveyor belt than the other, said nearer roller determining and effecting the final thickness of the meat patty, a flattening belt extending between said rollers and due to the relative positions of the rollers above the conveyor belt forming thereby a contracting throat, means for pivotly connecting with the table the ends of the flattening mechanism side members at the more remote flattening belt roller, and means for adjustably securing with the table the ends of the flattening mechanism side members at the nearer roller for adjusting the said side members about the pivotal mounting of the other end whereby the said nearer roller may be adjusted toward and from the conveyor belt to vary the ground meat patty thickness and vary the angle of convergence of the flattening belt, and non-yielding backing up means for the flattening belt carried by the flattening mechanism side members, comprising a plurality of backing up rollers for the flattening belt carried by the flattening mechanism side members between the belt rollers.

FRANK S. ELSAESSER.

REFERENCES CITED

The following references are of record in the file of this patent:

UNITED STATES PATENTS

| Number | Name | Date |
|---|---|---|
| 57,800 | Watson | Sept. 4, 1866 |
| 60,100 | Watson | Nov. 27, 1866 |
| 235,114 | Zinsser | Dec. 7, 1880 |
| 373,670 | Lingle et al. | Nov. 22, 1887 |
| 1,810,864 | Vogt | June 16, 1931 |
| 2,070,850 | Trabold | Feb. 16, 1937 |
| 2,226,442 | Rumsey, Jr. | Dec. 24, 1940 |